United States Patent
Eyssell et al.

(10) Patent No.: US 11,225,038 B2
(45) Date of Patent: Jan. 18, 2022

(54) METHOD FOR MANUFACTURING A SEMIFINISHED PRODUCT OR A COMPONENT MADE OF METAL AND FIBER COMPOSITE

(71) Applicants: VOESTALPINE STAHL GMBH, Linz (AT); VOESTALPINE METAL FORMING GMBH, Krems an der Donau (AT)

(72) Inventors: Carola Eyssell, Luftenberg (AT); Rüdiger Heinritz, Schwäbisch Gmünd (DE); Reiner Kelsch, Mutlangen (DE); Gerhard Mayrhofer, Altenfelden (AT); Christian Rouet, Gedersdorf (AT); Johannes Riegler, Buchkirchen (AT)

(73) Assignees: voestalpine Stahl GmbH, Linz (AT); voestalpine Metal Forming GmbH, Krems an der Donau (AT)

( * ) Notice: Subject to any disclaimer, the term of this patent is extended or adjusted under 35 U.S.C. 154(b) by 317 days.

(21) Appl. No.: 16/061,040

(22) PCT Filed: Dec. 12, 2016

(86) PCT No.: PCT/EP2016/080706
§ 371 (c)(1),
(2) Date: Aug. 27, 2018

(87) PCT Pub. No.: WO2017/098061
PCT Pub. Date: Jun. 15, 2017

(65) Prior Publication Data
US 2018/0354207 A1 Dec. 13, 2018

(30) Foreign Application Priority Data
Dec. 11, 2015 (EP) .................................. 15199680

(51) Int. Cl.
*B29C 70/52* (2006.01)
*B29C 70/40* (2006.01)
(Continued)

(52) U.S. Cl.
CPC .......... *B29C 70/528* (2013.01); *B21D 22/022* (2013.01); *B21D 22/22* (2013.01);
(Continued)

(58) Field of Classification Search
None
See application file for complete search history.

(56) References Cited

U.S. PATENT DOCUMENTS 4,659,425 A * 4/1987 Eggers ................ B32B 37/1027
216/20
5,024,714 A * 6/1991 Lemelson ............ B29C 70/088
156/243
(Continued)

FOREIGN PATENT DOCUMENTS

AT WO2013153229 A1 * 4/2013 ............. B29C 70/08
DE 19956394 A1 6/2001
(Continued)

OTHER PUBLICATIONS

M. Wacker, et al. "Sonderdrucke Härtung von Reaktionsharzen Time-Temperature-Transition-Diagramm," Jul. 18, 2013, XP055276610, Erlangen, Retrieved from the Internet: URL:http://www.lkt.uni-erlangen.de/publikationen/online-aufsaetze/ttt.pdf (retrieved on May 31, 2015), p. 2-4, 14-19; characterized in the International Search Report.
(Continued)

*Primary Examiner* — Matthew J Daniels
*Assistant Examiner* — Gregory C. Grosso

(57) ABSTRACT

A method for manufacturing a semifinished product or component is disclosed in which a metal support embodied
(Continued)

as a split strip is covered with at least one prepreg containing a thermally cross-linkable thermosetting matrix with endless fibers, the thermosetting matrix of the prepreg is pre-cross-linked by means of heating, and the metal support covered with the pre-cross-linked prepreg is formed into a semifinished product or component by means of roll forming. In order to enable plastic deformation in fiber-reinforced regions of the metal support, it is proposed that during the pre-cross-linking of the thermosetting matrix of the prepreg, its matrix is transferred into a viscosity state that is higher than its minimum viscosity and prior to reaching its gel point, the prepreg is formed together with the metal support.

13 Claims, 2 Drawing Sheets

(51) Int. Cl.

| | | |
|---|---|---|
| B32B 15/092 | (2006.01) | |
| B32B 15/14 | (2006.01) | |
| B29C 70/08 | (2006.01) | |
| B32B 5/02 | (2006.01) | |
| B32B 15/20 | (2006.01) | |
| B32B 3/26 | (2006.01) | |
| B32B 27/08 | (2006.01) | |
| B32B 27/40 | (2006.01) | |
| B32B 15/18 | (2006.01) | |
| B32B 19/02 | (2006.01) | |
| B32B 7/12 | (2006.01) | |
| B32B 27/38 | (2006.01) | |
| B32B 7/04 | (2019.01) | |
| B32B 19/04 | (2006.01) | |
| B32B 15/095 | (2006.01) | |
| B29C 70/88 | (2006.01) | |
| B21D 22/02 | (2006.01) | |
| B21D 22/22 | (2006.01) | |
| B21D 35/00 | (2006.01) | |
| B29C 70/46 | (2006.01) | |

(52) U.S. Cl.
CPC ......... *B21D 35/006* (2013.01); *B21D 35/008* (2013.01); *B29C 70/088* (2013.01); *B29C 70/40* (2013.01); *B29C 70/46* (2013.01); *B29C 70/885* (2013.01); *B32B 3/26* (2013.01); *B32B 5/024* (2013.01); *B32B 5/026* (2013.01); *B32B 5/028* (2013.01); *B32B 7/04* (2013.01); *B32B 7/12* (2013.01); *B32B 15/092* (2013.01); *B32B 15/095* (2013.01); *B32B 15/14* (2013.01); *B32B 15/18* (2013.01); *B32B 15/20* (2013.01); *B32B 19/02* (2013.01); *B32B 19/041* (2013.01); *B32B 27/08* (2013.01); *B32B 27/38* (2013.01); *B32B 27/40* (2013.01); *B32B 2255/06* (2013.01); *B32B 2255/205* (2013.01); *B32B 2255/28* (2013.01); *B32B 2260/021* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2270/00* (2013.01); *B32B 2307/50* (2013.01); *B32B 2307/732* (2013.01); *B32B 2307/752* (2013.01); *B32B 2457/08* (2013.01)

(56) References Cited

U.S. PATENT DOCUMENTS

| | | | |
|---|---|---|---|
| 2010/0133380 A1* | 6/2010 | Roebroeks | ................ B64C 1/12 244/119 |
| 2013/0340928 A1 | 12/2013 | Rotter et al. | |
| 2015/0298399 A1* | 10/2015 | Androsch | ............. B29C 70/088 264/134 |
| 2018/0354207 A1* | 12/2018 | Eyssell | .................. B32B 27/08 |

FOREIGN PATENT DOCUMENTS

| | | |
|---|---|---|
| DE | 102014001132 A1 | 7/2015 |
| EP | 2647486 A1 | 10/2013 |
| EP | 2859967 A1 | 4/2015 |
| WO | 2013153229 A1 | 10/2013 |

OTHER PUBLICATIONS

"Lieferprogramm Spaltband," Apr. 21, 2009, XP055361768, Düsseldorf, Retrieved from the Internet: URL:http://www.salzgitter-mannesmann-handel.de/service/_doc/broschueren/lp_spaltband_smsd.pdf (retrieved on Apr. 4, 2017), p. 2 characterized in the International Search Report.

\* cited by examiner

METHOD FOR MANUFACTURING A SEMIFINISHED PRODUCT OR A COMPONENT MADE OF METAL AND FIBER COMPOSITE

FIELD OF THE INVENTION

The invention relates to a method for manufacturing a semifinished product or component, in which a metal support embodied as a split strip is covered with at least one prepreg containing a thermally cross-linkable thermosetting matrix with endless fibers, the thermosetting matrix of the prepreg is pre-cross-linked by beating, and the metal support covered with the pre-cross-linked prepreg is formed into a semifinished product or component by means of roll forming.

BACKGROUND OF THE INVENTION

In order for a metal support—namely a metal sheet or blank—that is reinforced with prepregs having a thermosetting matrix with endless fibers, to be able to undergo a forming process, particularly a deep drawing process, in as damage-free a way as possible, it is known from the prior art (WO2013/153229A1) to shift the plastic deformations in the metal support into the covering-free regions of the metal support. There are thus covering-free regions on the semifinished product or component, which limits such fiber composite-reinforced semifinished products or components with regard to their lightweight design potential and thus their possibilities for use. In addition, this area limitation also limits the fiber length of the prepreg, which can result in reduced rigidity and strength. Also, semifinished products or components, which were deep drawn from sheet metal blanks with prepregs that had undergone unpressurized curing until they reached blocking strength, tended to delaminate and/or to have an increased porosity In the finally cross-linked fiber composite material—which among other things, negatively affects the reproducibility of the method.

SUMMARY OF THE INVENTION

The object of the invention, therefore, is to improve a method of the type explained at the beginning with regard to its simplicity, possibilities for use, and also reproducibility. In addition, a method should be enabled that has a reduced cycle time.

The invention attains the stated object in that during the cross-linking of the thermosetting matrix of the prepreg, its matrix is transferred into a viscosity state that is higher than its minimum viscosity and prior to reaching its gel point, the prepreg is formed together with the metal support.

If, during the pre-cross-linking of the thermosetting matrix of the prepreg, its matrix is transferred into a viscosity state that is higher than its minimum viscosity and the prepreg is formed together with the metal support prior to reaching its gel point, then this can not only permit a plastic deformation of the metal support in its fiber-reinforced regions, but also significantly improve the reproducibility of the method. Specifically, the prepreg in this state can permit relative movements between its endless fibers and the metal support that correspond to the forming radii. It is thus possible to follow even tight bending radii in the sheet metal blank without having to expect breakage or delamination. The method according to the invention can therefore be used in a particularly versatile way. Surprisingly, it has also been possible to achieve the fact that through the combined forming, it is possible to significantly improve the compaction of the matrix material with the fiber structure of the endless fibers. The comparatively short exertion of force, in particular pressurization, during the deformation can be used to reduce the porosity in the fiber composite—which makes it possible to increase the laminate quality and to further reduce the risk of a delamination of the fiber reinforcement in the sheet metal blank. According to the invention, transferring the matrix into a viscosity state that is higher than its minimum viscosity and forming the prepreg together with the metal support before the gel point of the matrix is reached can thus significantly increase the reproducibility of the method. It is also possible, through the combined forming of the prepreg and the metal support, to provide a particularly fast method sequence with a short cycle time. Furthermore, in comparison to other known methods for manufacturing fiber composite semifinished products or components, the method according to the invention does not involve any costly and/or complex-to-manage systems engineering—which in addition to reducing the costs for the method according to the invention, also yields an improvement in its reproducibility.

In general, it is noted that the metal support can be composed of sheet metals containing an iron, aluminum, or magnesium material, a light alloy or the like, or alloys thereof. The metal support can be embodied in the form of a steel plate with or without a protective coating, for example a zinc-based one.

In general, it is also noted that the thermosetting plastic matrix can have a combination with inorganic or organic reinforcing fibers, such as glass, basalt, carbon, or aramid. It is also conceivable for the metal support to be covered with a plurality of prepregs placed next to one another as well as a stacking of prepregs (single-layer or multilayer) on the metal support. The fibers contained in the prepreg can be in the form of a purely unidirectional layer. It is thus possible to use multilayer prepregs to produce a unidirectional or multidirectional laminate on the metal support.

It is also generally noted that a thermosetting plastic matrix can also have modified thermosetting polymer blends that are preferably composed of phases, which are made up of epoxy and polyurethane phases and are not necessarily cross-linked with one another. Known percentage compositions of such a PU-epoxy blend include, for example, 5 to 25 parts of the primary polyurethane phase surrounded by an epoxy matrix.

It is also generally noted that the viscosity of the matrix is determined under oscillation using a rheometer, namely an Anton Paar MCR 301 viscometer (e.g.: plate/plate configuration, diameter 25 mm; gap 1000 µm; amplitude 0.5%; angular frequency 10 rad/s), evaluated in accordance with ASTM D 4473 08/2016.

In order to reduce the risk of the thermosetting matrix, which has been heated above the viscosity minimum, being squeezed out from the prepreg in an unwanted fashion during the forming, it is possible for the degree of cross-linking of the thermosetting matrix to be set to 4 to 15% before the forming (e.g.: by means of temperature and/or time).

It can be particularly advantageous if during the forming, the degree of cross-linking of the thermosetting matrix is set to 20 to 45% (e.g.: by means of temperature and/or time). It is thus possible to additionally reduce the risk of the thermosetting matrix being squeezed out in an unwanted fashion during the forming. Also, with such a degree of cross-linking, the exertion of pressure on the prepreg during the forming can insure optimal conditions for achieving an increased laminate quality of the prepreg. This can also be beneficial to the adhesive strength between the material partners.

It can be particularly advantageous if during the forming, the degree of cross-linking of the thermosetting matrix is set to 25 to 40% (e.g.: by means of temperature and/or time).

If during the forming, the thermosetting matrix is heated to 120 to 220° C., then the cross-linking can be accelerated—thus making it possible for the forming to occur more quickly and for the cycle time of the method to be reduced.

It can be particularly advantageous if during the forming, the thermosetting matrix is heated to 150 to 180° C.

An unwanted cooling of the heated prepreg—and thus a change in the temperature that is disadvantageous for the method according to the invention—can be prevented if the forming tool is heated and the metal support is formed by the heated forming tool. In this way, the reproducibility of the method can be increased even more. It has been determined that for this purpose, the temperature of the forming tool can be different from the temperature of the prepreg or more precisely its matrix. It is also conceivable for the tools of the forming tool to have different temperatures in order to selectively temper the metal support in a region-specific way or to establish a temperature gradient in the laminate.

The cycle times for the forming can be reduced if after the combined forming, the prepreg undergoes unpressurized curing together with the metal support.

Because an intermediate layer, which bonds the prepreg to the metal support, is applied to the metal support before or during the covering of the metal support with the prepreg, it is possible on the one hand to improve the adhesive strength and on the other hand to also exert a compensating influence on thermal stresses. This intermediate layer should be applied all over, at least in the region of the metal support that is also covered with prepreg.

The layer thickness of the intermediate layer can preferably be from 50 µm to 1000 µm, with layer thicknesses of 80 µm to 700 µm being preferable. Thicker layers, preferably layer thicknesses of 500 µm to 1000 µm can prove advantageous due to the fact that they also provide a protection from corrosion (barrier layer). In applications with high rigidity requirements, thin films are preferable (preferably <150 µm). Furthermore, the processing time, i.e. the reaction time, is relevant—which must be taken into account above all with shorter cycle times. It has turned out that intermediate layers based on polyethylene, polypropylene, and/or with a polyamide core or also co-polyamide-based intermediate layers can be particularly well-suited in this connection. These can, for example, be systems from the company Nolax, namely the products Cox 391, Cox 422, and Cox 435, systems from the company Evonik, namely the product Vestamelt X1333-PI, or systems from the company Hexcel, namely the products TGA25.01A and DLS 1857.

It is also conceivable to exert this compressive force on the prepreg through the roll forming of the metal support, which is embodied as a split strip. A metal support of this kind—for example produced by longitudinal division of a metal strip—can also be embodied as a flat split strip in order to avoid a draping.

A creasing and/or bubble formation in the prepreg, which can occur in the course of the roll forming, can be successfully counteracted if after the roll forming of the metal support, the prepreg is once again pressed against the metal support. Preferably, this pressing takes place immediately after the roll forming. This can, for example, take place with the aid of roller pairs.

In order to facilitate the roll forming, it is possible for the metal support to be covered in some regions with at least one prepreg. This can further increase the reproducibility of the method.

The above advantages can occur particularly if 40 to 70% of one of the flat sides of the metal support is covered with prepreg.

In particular, the method according to the invention can be suitable for manufacturing a structural component. In general, it is noted that a structural component can be a component with a load-bearing structure. The structural component can be especially suitable for vehicles, in particular a motor vehicle, a road vehicle, a transport vehicle, a railway vehicle, an aircraft, or a space vehicle. A structural component can, for example, be a side sill, an A-pillar, a B-pillar, a C-pillar, a cross beam, or a longitudinal beam.

BRIEF DESCRIPTION OF THE DRAWINGS

The method for manufacturing a semifinished product or component according to the invention is shown in greater detail in the figures by way of example. In the drawings.

DETAILED DESCRIPTION OF THE PREFERRED EMBODIMENTS

Figure 1:
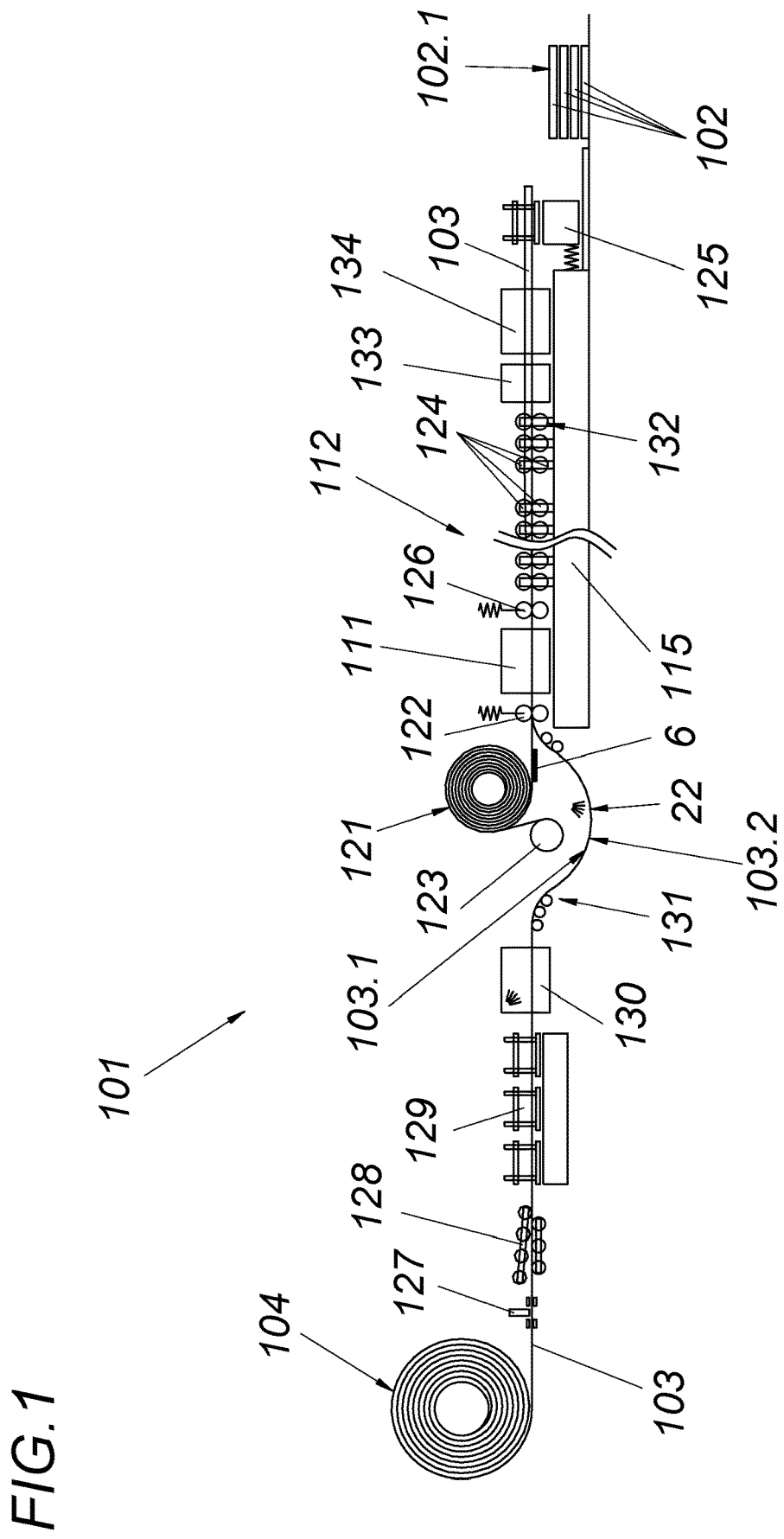
FIG. 1 shows a sequence of the method according to the invention in which a stand of a roll forming system is used to form a metal support that is covered with prepreg and FIG. 2 shows a time-dependent representation of the viscosity and the degree of cross-linking of the matrix of the prepreg that is used in the method according to FIG. 1.

According to the sequence in FIG. 1 for the method 101 according to the invention for manufacturing a component 102, stands 115 of a roll forming system are depicted as the forming tool 112.

A prepreg 6 provided on a support 121, which prepreg has already been preconditioned and is not shown to scale in terms of its dimensions and proportions, is placed onto a metal support 103, in fact on one flat side 103.1 of the two flat sides 103.1, 103.2. The metal support 103 is thus covered with prepreg 6 only in some regions. The split strip 104 is produced from a coil that is not shown in detail by longitudinal division/cutting.

The metal support 103 is guided together with the support 121 and prepreg 6 through a pressure roller pair 122, after which the support 121 remains on the metal support 103. The prepreg 6 can be covered with a protective film 123 on its top surface and/or underside. Before the prepreg 6 is put in place, at least the protective film 123 on the side of the prepreg 6 oriented toward the support 121 is removed and rolled up. Then the metal support 103 is covered with the prepreg 6.

The metal support 103 that is covered in this way is then guided through a continuous furnace 111—the heating leads to a pre-cross-linking of the thermosetting matrix of the prepreg 6. As a result, a degree of cross-linking a of 4 to 15% is set before the forming.

According to the invention, with this pre-cross-linking, the thermosetting matrix is transferred into a viscosity state 11 that is higher than its minimum viscosity ηmin and prior to reaching its gel point PC, the prepreg 6 is formed together with the metal support 103 by means of cooperating rollers 124 of the stand 115 of the roll forming system. According to the invention, this forming takes place in coordination with the pre-cross-linking of the thermosetting matrix of the prepreg 6, as indicated in FIG. 3. As a result, semifinished products or components 102 that are covered with prepreg 6 can be reproducibly manufactured with a short cycle time.

The advantageous combined forming of the thermosetting matrix with the metal support 103 is possible according to the invention because the prepreg 6, which is used in the state according to the invention, is able to follow the plastic shape changes brought about by the forming. Specifically, the endless fibers of the prepreg 6 are still able to move in the prepreg 6 relative to the metal support 103. The matrix of the prepreg 6 is in a viscosity state η that is higher than its minimum viscosity ηmin, as a result of which no breakage of the endless fibers or delamination of the fiber reinforcement on the metal support 103 occurs during the forming.

Figure 2:
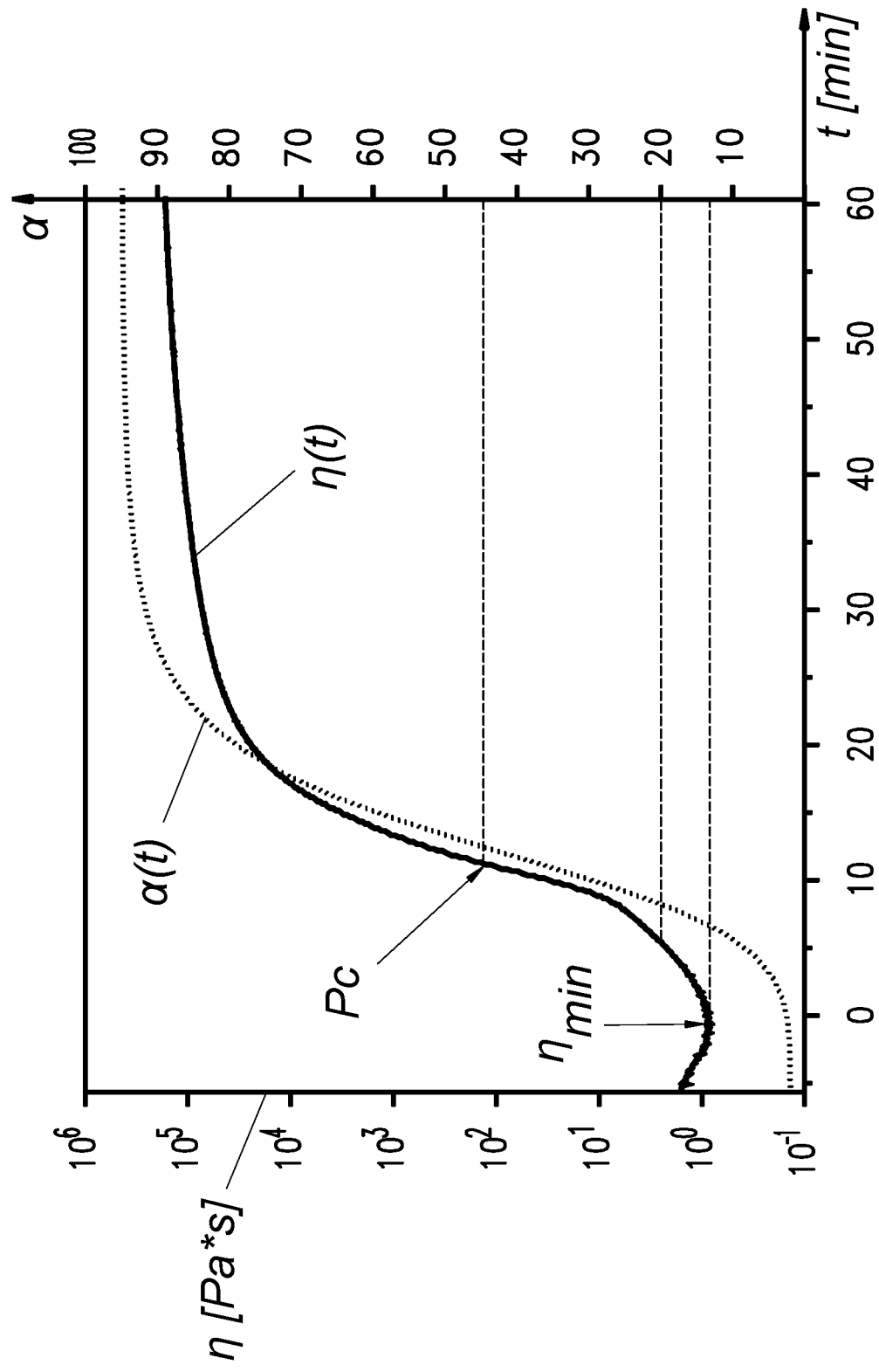

The depiction according to FIG. 2 relates to the following fiber composite material:
Metal support: Steel sheet: sheet thickness 0.81 mm
Laminate: Unidirectional, four layers of prepreg
Prepreg: Endless fibers with a fiber content of 57% in the matrix
 Thickness: 0.22 mm
Matrix: Thermosetting base (SGL Type E201: modified epoxy resin system)
 ηmin=0.9 Pa*s
 Pc=45%
Intermediate layer: 100 μm polypropylene The degree of cross-linking a of the matrix was determined by means of differential scanning calorimetry (DSC) measured in accordance with ISO 11357-5:2013.

Instead of a steel sheet, it is also conceivable to use a sheet composed of an aluminum alloy such as the 6xxx series. In general, it should be noted that differential scanning calorimetry (DSC), particularly the isothermal method according to ISO 11357-5:2013, can be suitable for measuring the cross-linking.

In the preferably heated forming tool 112, the degree of cross-linking a of the matrix, starting from 4 to 15% before the forming, is set to 20 to 45%, preferably 25 to 40%, during the forming, which 20 to 45% limits are shown with dashed lines in FIG. 2. Such a setting can, for example, be carried out by means of temperature and/or time.

With a preferably heated forming tool 112, it is also possible to insure that during the forming, the thermosetting matrix is kept at a temperature of 120 to 220° C. in order to be able to remove the component 102 from the forming tool 112 earlier due to the quicker cross-linking and to be able to thus shorten the process. A temperature of 150 to 180° C. has proven advantageous in many ways.

The metal support 103 that is to be covered can also have, among other things, a protective coating 21 such as a zinc or zinc alloy coating—as can be seen in FIG. 2. In the region that is covered all over with the prepreg 6, an intermediate layer 22 is placed onto this protective coating 21, i.e. onto the flat side 103.1 of the metal support 103. This intermediate layer 22 is produced by applying a polyamide-based coupling agent onto the metal support 103, as shown in FIG. 1. By means of this intermediate layer 22, the prepreg 6 can be bonded to the metal support 103 in an extremely strong and low-stress way.

FIG. 1 also shows that a floating cutting device 125 situated after the stands 115 cuts the formed metal support 103 to length to form components 102.

These cut-to-length components 102 can be subjected to yet another unpressurized cross-linking, which is not shown in detail. In particular, the components 102 can be suitably used as structural components 102.1, for example for vehicles.

After the continuous furnace 111—in order to improve the lamination quality of the prepreg 6—a compacting roller pair 126 can also be provided, which exerts pressure on the prepreg 6.

After a conventional strip preparation, which is carried out with the aid of a strip welding unit 127 and a straightening machine 128, the roll forming system also has a preliminary stamping press 129 with which the metal support 103 is perforated and/or stamped. Then the strip travels into the strip cleaning unit 130 where preferably, the areas that are to be provided with prepregs 6 are pre-cleaned. After the looping pit 131, prepreg 6 is applied, for example in the form of strips. FIG. 1 also shows that after the forming, a calibration 132 takes place and then an optional crease-smoothing 133 is carried out. This crease-smoothing 133 can, for example, be carried out with the aid of opposing rollers between which the roll-formed metal support 103 is guided and the prepreg 6 is once again pressed against the metal support 103. Then, the cross-linking can be initiated by means of an additional heat source 134.

As is shown in FIG. 1, the metal support 103 is covered with prepreg 6 only in some regions, specifically up to 40% to 70% on one flat side 103.1, which significantly facilitates the combined forming. The region 14 of the flat side 103.1 covered with prepreg 6 is therefore smaller in area than the entire area of the flat side 103.1.

The invention claimed is:

1. A method for manufacturing a semifinished product or component, comprising:
 covering a metal support embodied as a split strip with at least one prepreg containing a thermally cross-linkable thermosetting matrix with endless fibers, wherein the prepreg is applied in the form of strips,
 pre-cross-linking the thermosetting matrix of the prepreg by heating, and forming the metal support covered with the pre-cross-linked prepreg into a semifinished product or component by roll forming,
 wherein during the pre-cross-linking of the thermosetting matrix of the prepreg, the matrix of the prepreg is transferred into a viscosity state that is higher than a minimum viscosity of the matrix and prior to reaching a gel point of the matrix, the prepreg is formed together with the metal support.

2. The method according to claim 1, wherein before the forming, the degree of cross-linking of the thermosetting matrix is set to 4 to 15%.

3. The method according to claim 1, wherein during the forming, the degree of cross-linking of the thermosetting matrix is set to 20 to 45%.

4. The method according to claim 3, wherein during the forming, the degree of cross-linking of the thermosetting matrix is set to 25 to 40%.

5. The method according to claim 1, wherein during the forming, the thermosetting matrix is heated to 120 to 220° C.

6. The method according to claim 5, wherein during the forming, the thermosetting matrix is heated to 150 to 180° C.

7. The method according to claim 1, comprising heating the forming tool and forming the metal support by the heated forming tool.

8. The method according to claim 1, wherein after the combined forming of the semifinished product or component, the prepreg undergoes unpressurized curing together with the metal support.

9. The method according to claim 1, comprising, before or during the covering of the metal support with the prepreg, applying an intermediate layer to the metal support, which bonds the prepreg to the metal support.

10. The method according to claim 1, wherein after the roll forming of the metal support, the prepreg is once again pressed against the metal support.

11. The method according to claim 1, comprising covering the metal support in some regions with at least one prepreg.

12. The method according to claim 11, wherein 40 to 70% of a flat side of the metal support is covered with the at least one prepreg.

13. The method according to claim 1 comprising manufacturing a structural component.

* * * * *

UNITED STATES PATENT AND TRADEMARK OFFICE
CERTIFICATE OF CORRECTION

| | |
|---|---|
| PATENT NO. | : 11,225,038 B2 |
| APPLICATION NO. | : 16/061040 |
| DATED | : January 18, 2022 |
| INVENTOR(S) | : Carola Eyssell et al. |

It is certified that error appears in the above-identified patent and that said Letters Patent is hereby corrected as shown below:

In the Specification

Column 4, Line 61, "11" should read --ŋ--.
Column 5, Line 37, "a" should read --α--.

Signed and Sealed this
Twenty-fifth Day of October, 2022

*Katherine Kelly Vidal*

Katherine Kelly Vidal
*Director of the United States Patent and Trademark Office*